United States Patent
Savant

(10) Patent No.: US 8,732,662 B1
(45) Date of Patent: May 20, 2014

(54) ADAPTIVE USER INTERFACE AND APPLICATION FEATURES BASED ON USER EXPERIENCE LEVEL

(75) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 572 days.

(21) Appl. No.: 12/841,054

(22) Filed: Jul. 21, 2010

(51) Int. Cl.
  *G06F 9/44* (2006.01)
  *G06F 9/445* (2006.01)

(52) U.S. Cl.
  USPC ............ 717/120; 717/121; 717/168; 717/177

(58) Field of Classification Search
  None
  See application file for complete search history.

(56) References Cited

U.S. PATENT DOCUMENTS

| | | | | |
|---|---|---|---|---|
| 7,793,260 B2 * | 9/2010 | Fields et al. | ................. | 717/121 |
| 7,984,424 B2 * | 7/2011 | Dengler et al. | ............... | 717/120 |
| 8,127,274 B2 * | 2/2012 | Astheimer | .................... | 717/120 |
| 8,572,560 B2 * | 10/2013 | Drissi et al. | .................. | 717/120 |
| 2006/0230382 A1 * | 10/2006 | Moulckers | ..................... | 717/120 |
| 2008/0148150 A1 * | 6/2008 | Mall | .............................. | 715/707 |
| 2008/0155534 A1 * | 6/2008 | Boss et al. | ..................... | 717/178 |
| 2009/0089751 A1 * | 4/2009 | Raikes et al. | ................. | 717/120 |
| 2010/0088689 A1 * | 4/2010 | Levi et al. | ..................... | 717/168 |
| 2012/0089977 A1 * | 4/2012 | Park et al. | ..................... | 717/177 |
| 2012/0324440 A1 * | 12/2012 | Greenbaum | ................. | 717/177 |

OTHER PUBLICATIONS

Huang et al., Investigation of software patterns of user experience, Nov. 2010, 2 pages.*

* cited by examiner

*Primary Examiner* — Thuy Dao
(74) *Attorney, Agent, or Firm* — Brill Law Office; Jeffrey Brill

(57) ABSTRACT

The behavior of an application is modified, responsive to an experience level of a user as calculated based on information concerning the configuration of the user's computer. Information concerning the configuration of the user's computer that is indicative of the user's experience level is gleaned. An experience index for the user is calculated, based on the gleaned information, and assigned to the user. Based on the calculated experience index, the behavior of an application utilized by the user is modified. This can comprise selecting a user interface for the application based on the user's calculated experience index, and outputting the selected user interface when the user runs the application. The modifying can also comprise selecting a version and/or features of the application for the user, based on the calculated experience index.

20 Claims, 4 Drawing Sheets

ADAPTIVE USER INTERFACE AND APPLICATION FEATURES BASED ON USER EXPERIENCE LEVEL

TECHNICAL FIELD

This disclosure pertains generally to computer user interfaces and applications features, and more specifically to automatically modifying an application based on the user's experience level.

BACKGROUND

Designing and implementing the user interface is a challenging part of creating a software application. A user interface should be simple and intuitive enough for less technically inclined users, yet at the same time should be powerful and offer more savvy users access to advanced features. Because the levels of technical experience and sophistication vary so greatly between different users, it can be preferable to provide multiple user interfaces for different users, rather than attempting to implement a one size fits all solution.

One conventional solution to this problem is to offer various interface choices to the user when the software application is installed or runs. For example, the user could be prompted as to whether s/he would like a beginner's user interface or an advanced user interface. However, this places certain burdens on the user. First of all, less sophisticated users often do not know what level of interface would be the best fit for them. Very inexperienced users might not even understand the question being asked. Additionally, many less sophisticated users fancy themselves as being more savvy than they actually are, and could select an advanced option which is in fact not appropriate for them. Furthermore, even where a user has a good idea of what level of interface is appropriate, requiring the user to input this information slows down the installation process and can potentially detract from the overall user experience.

Another conventional solution is to change the user interface over time, based on which functions of the application the user actually selects (e.g., remove unselected options from menus over time, etc.). The problem with this is that all users start with the same interface, and only over time is the interface adjusted for the individual user. Thus, a given user can start out running an interface that is either too complicated or too simple. Additionally, the functions of the individual application that a user does or does not utilize within a given period of time is a limited measurement of the user's experience level, and does not necessarily result in an appropriate interface for the user.

It would be desirable to address these issues.

SUMMARY

The behavior of an application is modified, responsive to an experience level of a user as calculated based on information concerning the configuration of the user's computer. Information concerning the configuration of the user's computer that is indicative of the user's experience level is gleaned. This gleaning of information concerning the configuration of the user's computer can comprise performing steps such as identifying applications installed on the user's computer, identifying applications configured to run on startup of the user's computer, identifying the operating system and or operating system version installed on the user's computer, identifying operating system settings as configured on the user's computer and examining network history on the user's computer, such as identifying external sites recently visited by the user.

An experience index for the user is calculated, based on gleaned information concerning the configuration of the user's computer that is indicative of the user's experience level. This can comprise calculating the experience index for the user as a binary indication of whether to classify the user as advanced, based on gleaned information concerning the configuration of the user's computer. In some embodiments, this can further comprise determining to classify the user as advanced, based on gleaning specific information concerning the configuration of the user's computer, such as the installation of developer's tools, or recent visits to developer oriented websites. In other embodiments, this can further comprise calculating the experience index for the user based on weighing specific pieces of gleaned information concerning the configuration of the user's computer, and determining whether to classify the user as advanced, based on whether the calculated experience index meets a given threshold. The user can also be classified as having one of a plurality of experience levels (including a plurality comprising more than two levels), based on the calculated experience index. In such embodiments, the experience index for the user is calculated based on weighing specific pieces of gleaned information concerning the configuration of the computer of the user. Once the experience index is calculated, it is assigned to the user, and classifies the experience level of the user.

Based on the calculated experience index assigned to the user, the behavior of an application utilized by the user is modified. This can comprise selecting a user interface for the application for the user based on the calculated experience index assigned to the user (e.g., a simple interface, an advanced interface), and outputting the selected user interface when the user runs the application. The modifying can also or in addition comprise selecting a version and/or features of the application for the user, based on the calculated experience index assigned to the user, and deploying that version and/or those features when the application is installed and/or run by the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
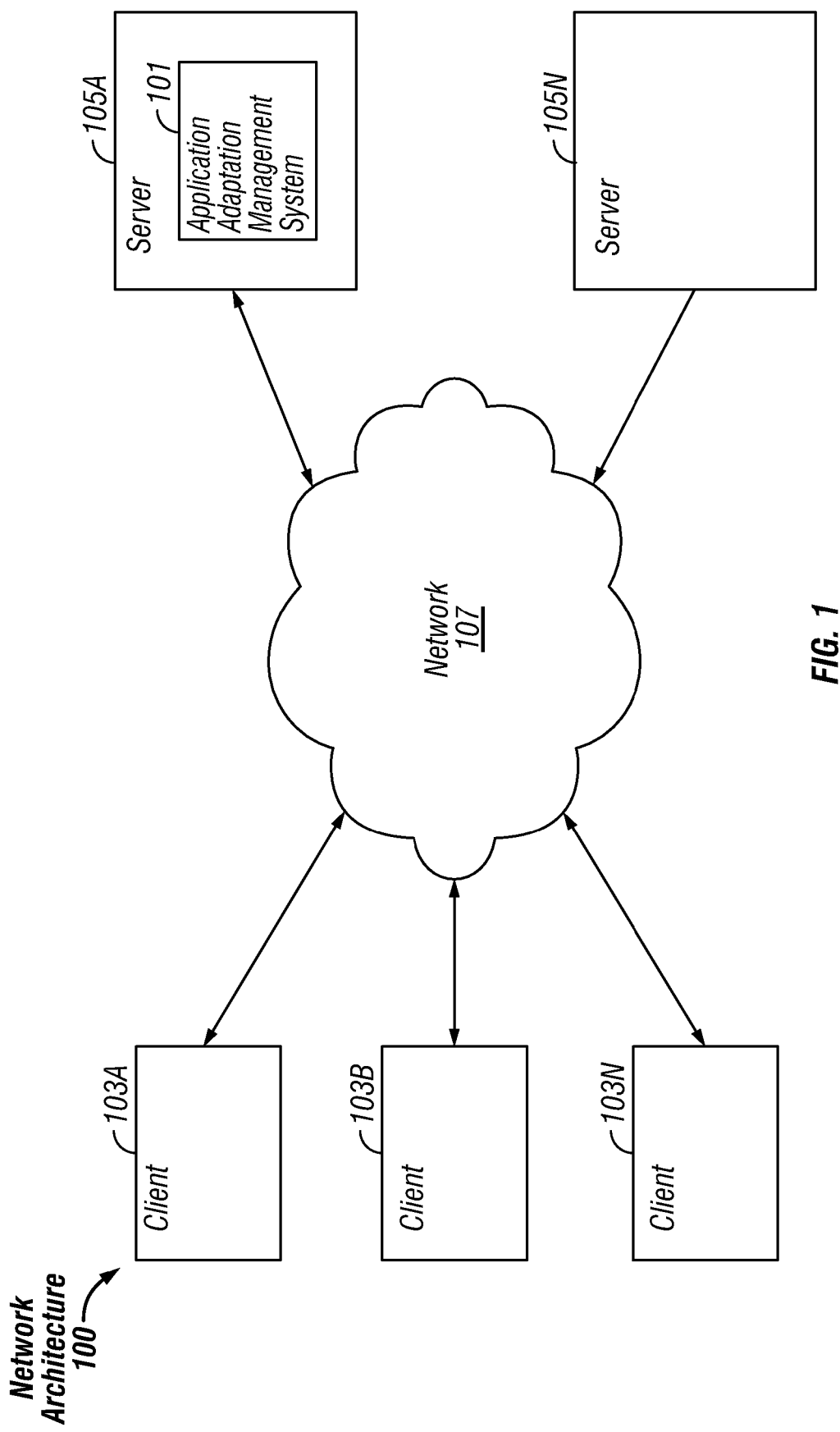
FIG. 1 is a block diagram of an exemplary network architecture in which an application adaptation management system can be implemented, according to some embodiments.

FIG. 1 is a block diagram illustrating an exemplary network architecture 100 in which an application adaptation management system 101 can be implemented. The illustrated network architecture 100 comprises multiple clients 103A, 103B and 103N, as well as multiple servers 105A and 105N. In FIG. 1, the application adaptation management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
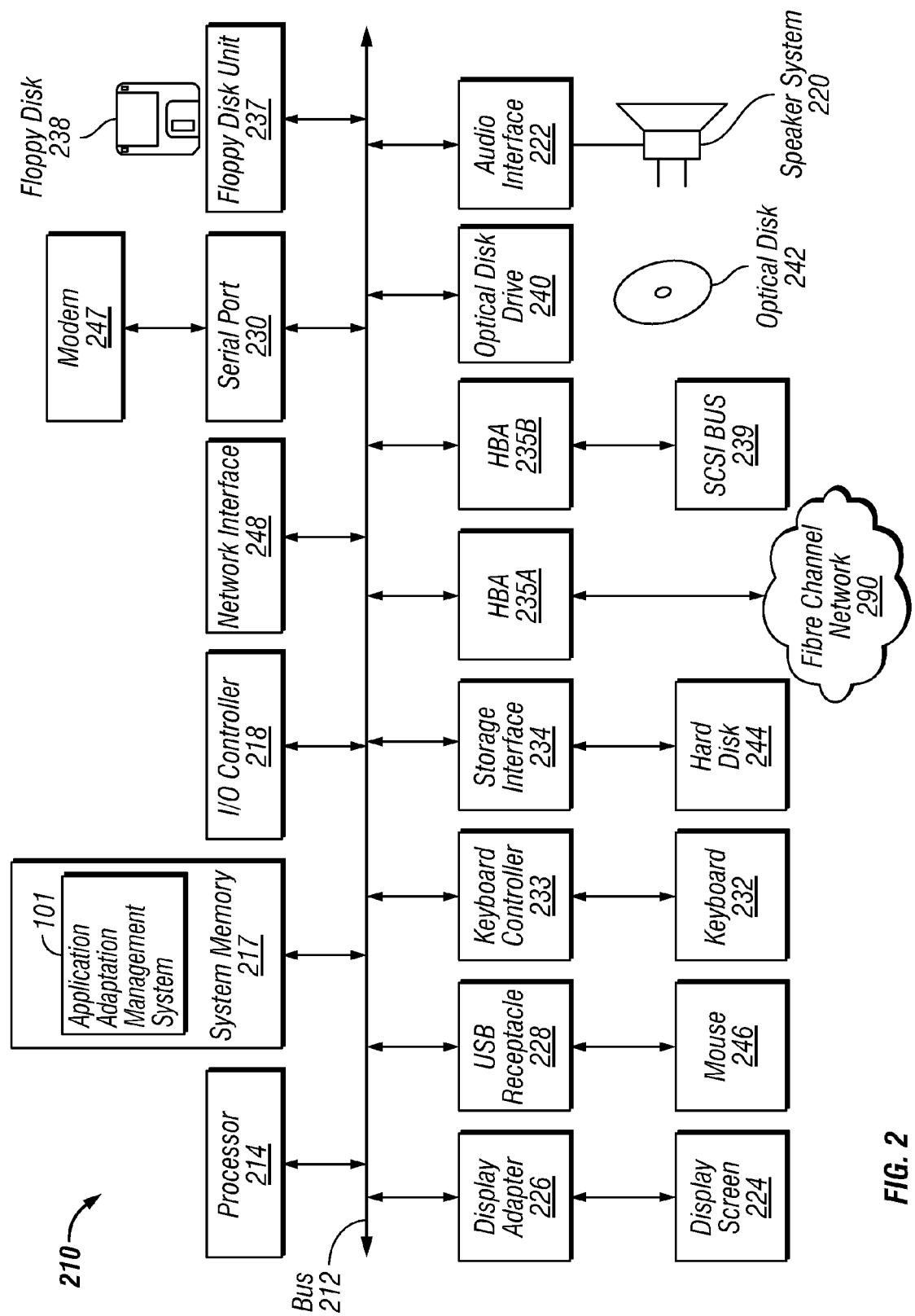
FIG. 2 is a block diagram of a computer system suitable for implementing an application adaptation management system, according to some embodiments.

FIG. 2 is a block diagram of a computer system 210 suitable for implementing an application adaptation management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the application adaptation management system 101 is illustrated as residing in system memory 217. The workings of the application adaptation management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
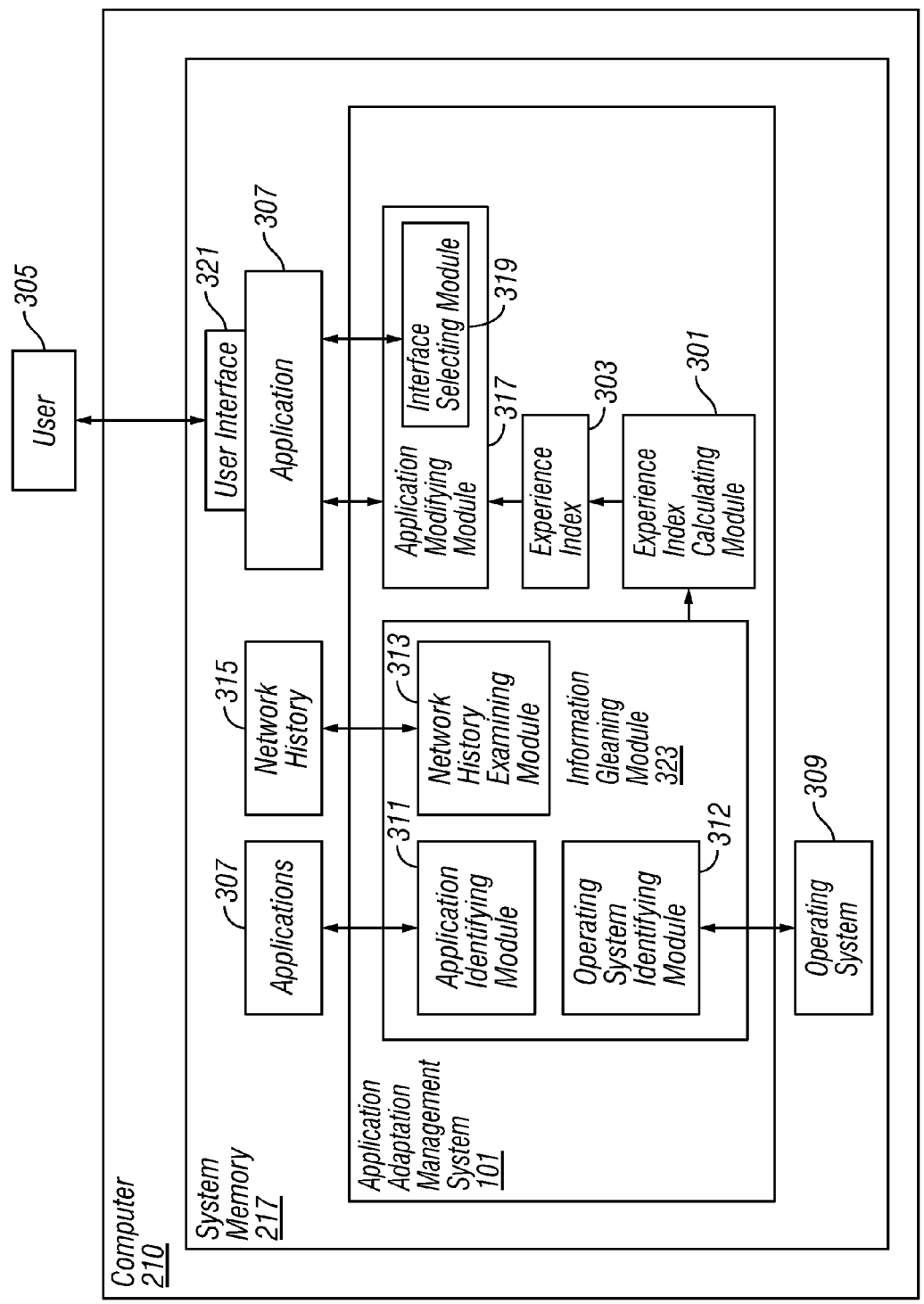
FIG. 3 is a block diagram of the operation of an application adaptation management system, according to some embodiments.

FIG. 3 illustrates the operation of an application adaptation management system 101 residing in the system memory 217 of a client computer 103, according to some embodiments. As described above, the functionalities of the application adaptation management system 101 can reside on a client 103, a server 105, or be distributed between multiple computer systems 210, including within a cloud-based computing environment in which the functionality of the application adaptation management system 101 is provided as a service over a network 107. It is to be understood that although the application adaptation management system 101 is illustrated in FIG. 3 as a single entity, the illustrated application adaptation management system 101 represents a collection of functionalities, which can be instantiated as a single or multiple modules as desired (an instantiation of specific, multiple modules of the application adaptation management system 101 is illustrated in FIG. 3). It is to be understood that the modules of the application adaptation management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the application adaptation management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an experience index calculating module 301 of the application adaptation management system 101 calculates an experience index 303 as a measurement of the experience level of the user 305. As explained in more detail below, the experience index calculating module 301 can calculate the experience index 303 for the user 305 based on a variety of factors concerning the configuration of the user's computer 210, such as which applications 307 the user 305 has installed (e.g., developer tools or end user applications only), the type/version of the operating system 309 installed on the user's computer 210 (e.g., professional, home, server, client, etc.), specific operating system 309 settings (e.g., advanced, default, rights assigned to the user 305) and external sites visited by the user 305 (e.g., developer oriented websites, technical troubleshooting websites) gleaned from, e.g., the contents of the web browser cache.

In order to calculate an experience index 303, an information gleaning module 323 of the of the application adaptation management system 101 gleans information concerning the configuration of the user's computer 210. This gleaned information can take various forms in different embodiments. In one embodiment, an application identifying module 311 of the application adaptation management system 101 identifies applications 307 the user 305 has installed. This can be done in various ways, for example by reading the appropriate operating system 309 data. Under Microsoft Windows® this comprises reading the user software configuration data in the registry (e.g., looking under HKEY_CURRENT_USER\Software\). The specific implementation mechanics for identifying which applications 307 the user 305 has installed can vary between operating systems 309 and versions thereof.

In some embodiments, the application identifying module 311 checks whether the user 305 has installed specific applications 307 indicative of advanced user 305 status (for example, by looking for specific key values in the registry). Examples of the types of applications 307 that can be indicative of an advanced user 305 are software development tools (e.g., Visual Studio, compliers, debuggers, program editors, version control systems, etc.), Windows Sysinternals tools and virtualization systems. In some embodiments, certain applications 307 or application types can also be considered indicative of a user 305 not being advanced (e.g., remedial help programs). It is to be understood that in different embodiments, different specific applications 307 or application types can be considered as evidence of a user 305 being (or not being) advanced. The specific applications 307 and or application types to look for can vary between embodiments and over time as desired.

In some embodiments the application identifying module 311 also checks which startup applications 307 the user 305 has configured, by, for example, reading the appropriate registry key (e.g., HKEY_CURRENT_USER\Software\Microsoft\Windows\CurrentVersion\Run). As with applications 307 installed but not configured to run on startup, which startup applications 307 are considered evidence of a user 305 being advanced or otherwise can vary between embodiments as desired.

In some embodiments, an operating system identifying module 312 of the application adaptation management system 101 identifies which operating system 309 (including which version) the user 305 is running, as evidence of the user's experience level. This can be done, for example, by reading an appropriate registry key or other identifier (e.g., HKEY_CURRENT_USER\Software\Microsoft\windows\Currentversion). It is to be understood that the specific implementation mechanics for identifying the operating system 309 in use varies between operating systems 309 and versions of operating systems 309.

In some embodiments, the operating system identifying module 312 also identifies the user's operating system 309 settings, in order to detect advanced, customized settings indicative of an advanced user 305 and/or default settings indicative of a novice user 305. To do so, the operating system identifying module 312 can read, e.g., HKEY_CURRENT_USER\Software\Microsoft\Windows\CurrentVersion\Explorer\Advanced, and determine which advanced settings the user 305 has enabled if any (e.g., show hidden files, hide protected operating system files, etc.). The specific implementation mechanics for identifying operating system 309 settings can vary between operating systems 309 and versions thereof. The specific operating systems 309, operating system 309 versions and operating system 309 settings which are considered evidence of a user 305 being advanced and/or not advanced can vary between embodiments as desired.

In some embodiments, a network history examining module 313 of the application adaptation management system 101 examines the user's network history 315, in order to glean evidence of the user's experience level. For example, if the user 305 has been visiting technical websites intended for developers or IT professionals (e.g., bytes.com, computerworld.com, Doctor Dobb's Journal, etc.) this can be considered evidence of the user being advanced. The network history examining module 313 can examine the user's network history by, for example, reading the browser cache. (e.g., %USERPROFILE%\Local\Microsoft\Windows\Temporary Internet Files).

Based on gleaned information concerning the state of the user's computer 210 (such as information of the types described above), the experience index calculating module 301 calculates an experience index 303 indicative of the experience level of the user 305. It is to be understood that the specific information to glean concerning the state of the user's computer 210 to this end can vary between embodiments as desired, as can the specific use of that information in the calculation of the experience index 303. In some embodiments, the experience index 303 is calculated as a binary indication of whether or not the user 305 meets a given, sufficient threshold of experience to be classified as an advanced user 305. In some of these embodiments, if any qualifying information concerning the state of the user's computer 210 is found, the experience index 303 is set to indicate that the user 305 is advanced. What constitutes qualifying information can vary between embodiments. For example, in one embodiment, if any, e.g., software development tools are identified on the user's computer 210, the experience index 303 is set to indicate that the user 305 is advanced. In other embodiments, certain qualifying information concerning the state of the user's computer 210 can result in setting the experience index 303 to indicate that the user 305 is not advanced.

In other embodiments, various gleaned information concerning the state of the user's computer 210 is indicative but not determinative of the user's experience level. In such embodiments, the experience index calculating module 301 adjusts the experience index 303 up or down responsive to pieces of gleaned information. How much to weigh given information as being indicative of the user's experience level is a variable design parameter. Once the experience index calculating module 301 has processed all of the gleaned information, it assigns the resulting calculated experience index 303 to the user 305. In some such embodiments, the experience index 303 is calculated to classify the user 305 as being either advanced or not advanced, based on whether the calculated experience index 303 exceeds a given threshold. In other embodiments, more than two experience levels are possible (e.g., novice, intermediate, advanced, expert), and the experience index 303 is calculated to classify the user according to an appropriate level (e.g., an experience index 303 below a first given threshold means the user is to be classified as a novice, above a first given threshold but below a second given threshold means the user is to be classified as intermediate, etc.). The number of experience levels to use and the corresponding thresholds at which a user 305 is so classified are variable design parameters.

Responsive to the calculated experience index 303, an application modifying module 317 of the application adaptation management system 101 modifies the behavior of at least one application 307 when that application is utilized (e.g., installed on run) by the user 305. In some embodiments, this can be in the form of an interface selecting module 319 selecting a user interface 321 that is appropriate for the user 305 based on the assigned experience index 303. In embodiments in which users 303 are classified as being either advanced or not, the user interface 321 to output for any given application 307 is always one of two (e.g., a simple one and a more advanced one), based on the user's experience index 303. In other embodiments in which more degrees of classification are utilized, the interface selecting module 319 selects from a variety of users interfaces 321 (e.g., ranging from very simple to more advanced) based on the experience index 303 calculated for the particular user 305.

In some embodiments, in addition to selecting an appropriate user interface 321 based on the user's experience index 303, other operations concerning application 307 usage can be controlled as well. For example, in one embodiment the application modifying module 317 can determine which version of an application 307 (e.g., entry level, advanced, expert) and/or which application features to install and/or run based on the user's experience index 303.

As a specific example, imagine a specific application 307 running in association with the application adaptation management system 101. The application has two separate modes in which it can run, normal mode and advanced mode. Normal mode is meant for standard users 305, and has a simpler interface 321 and fewer features. Advanced mode is designed for advanced users, and has a more complicated interface 321 and additional features. Rather than requiring the user 305 to decide which mode to run in, the application adaptation management system 101, by operating as described above, can calculate an experience index 303 for the user 305 based on the state of the user's computer 210, and run the application 307 in the appropriate mode for the user 305.

Figure 4:
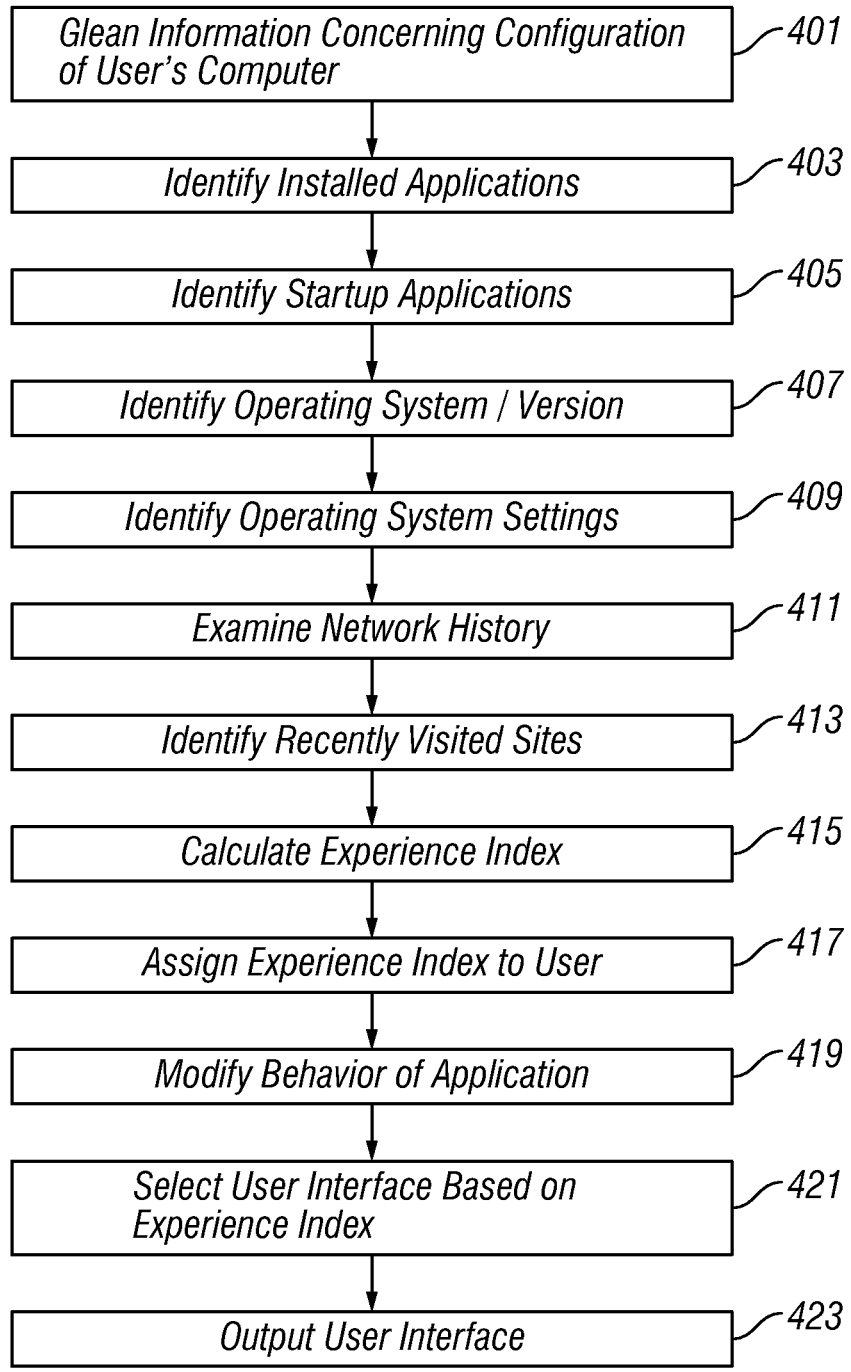
FIG. 4 is a flowchart of the operation of an application adaptation management system, according to some embodiments.

FIG. 4 illustrates steps of the operation of the application adaptation management system 101 (FIG. 1), according to some embodiments. An information gleaning module 323 (FIG. 3) gleans 401 information concerning the configuration of the user's computer 210 (FIG. 2). In some embodiments, this takes the more specific form of an application identifying module 311 (FIG. 3) identifying 403 applications 307 (FIG. 1) installed on the user's computer 210 (FIG. 2). The application identifying module 311 (FIG. 3) can also identify 405 applications 307 (FIG. 3) configured to run on startup of the user's computer 210 (FIG. 2). An operating system identifying module 312 (FIG. 3) can identify 407 the operating system 309 (FIG. 3) and/or the version thereof installed on the user's computer 210 (FIG. 2). The operating system identifying module 312 (FIG. 3) can also identify 409 operating system settings 309 (FIG. 3) as configured on the user's computer 210 (FIG. 2). A network history examining module 313 (FIG. 3) can examines 411 the user's network history 315. This can comprise the network history examining module 313 (FIG. 3) identifying 413 external sites recently visited by the user 305 (FIG. 3).

An experience index calculating module 301 (FIG. 3) calculates 415 an experience index 303 (FIG. 3), based on gleaned information concerning the configuration of the user's computer 210 (FIG. 2) that is indicative of the user's experience level. The experience index calculating module 301 (FIG. 3) assigns 417 the calculated experience index 303 (FIG. 3) to the user 305 (FIG. 3), thereby classifying the user's experience level. Based on the calculated experience index 303 (FIG. 3) assigned to the user 305 (FIG. 3), an application modifying module 317 (FIG. 3) modifies 419 the behavior of an application 307 (FIG. 3) utilized by the user 305 (FIG. 3). This can comprise an interface selecting module 319 (FIG. 3) selecting 421 and outputting 423 a user interface 321 (FIG. 3) that is appropriate for the user 305 (FIG. 3) based on the assigned experience index 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically modifying behavior of an application responsive to an experience level of a user, the method comprising the steps of:
   gleaning, by at least one computer, information concerning a configuration of a computer of the user at installation of an application;
   wherein gleaning information concerning the configuration of the computer of the user further comprises performing at least three steps from a group of steps consisting of: identifying applications installed on the computer of the user, said identified applications being indicative of an experience level of the user; identifying applications configured to run on startup of the computer of the user, said identified applications being indicative of an experience level of the user; identifying an operating system installed on the computer of the user, said operating system being indicative of an experience level of the user; identifying a version of the operating system installed on the computer of the user, said version of the operating system being indicative of an experience level of the user; identifying operating system settings as configured on the computer of the user, said operating system settings being indicative of an experience level of the user; examining network history on the computer of the user, said network history being indicative of an experience level of the user; and identifying external sites recently visited by the user, said external sites recently visited by the user being indicative of an experience level of the user;
   calculating, by the at least one computer, an experience index for the user, based on gleaned information concerning the configuration of the computer of the user;
   assigning, by the at least one computer, the calculated experience index to the user, the calculated experience index classifying an experience level of the user; and automatically modifying, by the at least one computer, behavior of the application prior to use by the user based on the calculated experience index assigned to the user; wherein modifying behavior of the application prior to use by the user based on the calculated experience index assigned to the user further comprises selecting a user interface for the application for the user, based on the calculated experience index assigned to the user, and outputting the selected user interface.

2. The method of claim 1 wherein gleaning, by at least one computer, information concerning the configuration of the computer of the user further comprises:
identifying, by the at least one computer, applications installed on the computer of the user, said identified applications being indicative of an experience level of the user.

3. The method of claim 1 wherein gleaning, by at least one computer, information concerning the configuration of the computer of the user further comprises:
identifying, by the at least one computer, applications configured to run on startup of the computer of the user, said identified applications being indicative of an experience level of the user.

4. The method of claim 1 wherein gleaning, by at least one computer, information concerning the configuration of the computer of the user further comprises:
identifying, by the at least one computer, an operating system installed on the computer of the user, said operating system being indicative of an experience level of the user.

5. The method of claim 4 wherein identifying, by the at least one computer, the operating system installed on the computer of the user further comprises:
identifying, by the at least one computer, a version of the operating system installed on the computer of the user, said version of the operating system being indicative of an experience level of the user.

6. The method of claim 1 wherein gleaning, by at least one computer, information concerning the configuration of the computer of the user further comprises:
identifying, by the at least one computer, operating system settings as configured on the computer of the user, said operating system settings being indicative of an experience level of the user.

7. The method of claim 1 wherein gleaning, by at least one computer, information concerning the configuration of the computer of the user further comprises:
examining, by the at least one computer, network history on the computer of the user, said network history being indicative of an experience level of the user.

8. The method of claim 7 wherein examining, by the at least one computer, network history on the computer of the user further comprises:
identifying, by the at least one computer, external sites recently visited by the user, said external sites recently visited by the user being indicative of an experience level of the user.

9. The method of claim 1 wherein calculating, by the at least one computer, the experience index for the user, based on gleaned information concerning the configuration of the computer of the user further comprises:
calculating, by the at least one computer, the experience index for the user as a binary indication of whether to classify the user as advanced, based on gleaned information concerning the configuration of the computer of the user.

10. The method of claim 9 wherein calculating, by the at least one computer, the experience index for the user as a binary indication of whether to classify the user as advanced, based on gleaned information concerning the configuration of the computer of the user further comprises:
determining, by the at least one computer, whether to classify the user as advanced, based on gleaning specific information concerning the configuration of the computer of the user.

11. The method of claim 9 wherein calculating, by the at least one computer, the experience index for the user as a binary indication of whether to classify the user as advanced, based on gleaned information concerning the configuration of the computer of the user further comprises:
calculating, by the at least one computer, the experience index for the user based on weighing specific pieces of gleaned information concerning the configuration of the computer of the user; and
determining, by the at least one computer, whether to classify the user as advanced, based on whether the calculated experience index meets a given threshold.

12. The method of claim 1 wherein calculating, by the at least one computer, the experience index for the user, based on gleaned information concerning the configuration of the computer of the user further comprises:
calculating, by the at least one computer, the experience index for the user based on weighing specific pieces of gleaned information concerning the configuration of the computer of the user; and
classifying the user as having one of a plurality of experience levels, based on the calculated experience index.

13. The method of claim 1 wherein modifying, by the at least one computer, behavior of the application prior to use by the user based on the calculated experience index assigned to the user further comprises:
selecting, by the at least one computer, a version of the application for the user, based on the calculated experience index assigned to the user.

14. The method of claim 1 wherein modifying, by the at least one computer, behavior of the application prior to use by the user based on the calculated experience index assigned to the user further comprises:
selecting, by the at least one computer, at least one specific feature of the application for the user, based on the calculated experience index assigned to the user.

15. At least one non-transitory computer readable storage medium storing a computer program product for automatically modifying behavior of an application responsive to an experience level of a user, the computer program product comprising:
program code for gleaning information concerning a configuration of a computer of the user at installation of an application;
wherein gleaning information concerning the configuration of the computer of the user further comprises performing at least three steps from a group of steps consisting of: identifying applications installed on the computer of the user, said identified applications being indicative of an experience level of the user; identifying applications configured to run on startup of the computer of the user, said identified applications being indicative of an experience level of the user; identifying an operating system installed on the computer of the user, said operating system being indicative of an experience level of the user; identifying a version of the operating system installed on the computer of the user, said version of the operating system being indicative of an experience level of the user; identifying operating system settings as configured on the computer of the user, said operating system settings being indicative of an experience level of the user; examining network history on the computer of the user, said network history being indicative of an experience level of the user; and identifying external sites recently visited by the user, said external sites recently visited by the user being indicative of an experience level of the user;

program code for calculating an experience index for the user, based on gleaned information concerning the configuration of the computer of the user;

program code for assigning the calculated experience index to the user, the calculated experience index classifying an experience level of the user; and program code for automatically modifying behavior of the application prior to use by the user based on the calculated experience index assigned to the user;

wherein modifying behavior of the application prior to use by the user based on the calculated experience index assigned to the user further comprises selecting a user interface for the application for the user, based on the calculated experience index assigned to the user, and outputting the selected user interface.

16. The computer program product of claim 15 wherein the program code for gleaning information concerning the configuration of the computer of the user at installation of the application further comprises program code for:

identifying applications installed on the computer of the user, said identified applications being indicative of an experience level of the user.

17. The computer program product of claim 15 wherein the program code for calculating the experience index for the user, based on gleaned information concerning the configuration of the computer of the user at installation of the application further comprises program code for performing at least one step from a group of steps consisting of:

calculating the experience index for the user as a binary indication of whether to classify the user as advanced, based on gleaned information concerning the configuration of the computer of the user; and calculating the experience index for the user based on weighing specific pieces of gleaned information concerning the configuration of the computer of the user.

18. A computer system for automatically modifying behavior of an application responsive to an experience level of a user, the computer system comprising:

a processor;

system memory;

means for gleaning information concerning a configuration of a computer of the user at installation of an application;

wherein gleaning information concerning the configuration of the computer of the user further comprises performing at least three steps from a group of steps consisting of: identifying applications installed on the computer of the user, said identified applications being indicative of an experience level of the user; identifying applications configured to run on startup of the computer of the user, said identified applications being indicative of an experience level of the user; identifying an operating system installed on the computer of the user, said operating system being indicative of an experience level of the user; identifying a version of the operating system installed on the computer of the user, said version of the operating system being indicative of an experience level of the user; identifying operating system settings as configured on the computer of the user, said operating system settings being indicative of an experience level of the user; examining network history on the computer of the user, said network history being indicative of an experience level of the user; and identifying external sites recently visited by the user, said external sites recently visited by the user being indicative of an experience level of the user;

means for calculating an experience index for the user, based on gleaned information concerning the configuration of the computer of the user;

means for assigning the calculated experience index to the user, the calculated experience index classifying an experience level of the user; and means for modifying behavior of the application prior to use by the user based on the calculated experience index assigned to the user;

wherein modifying behavior of the application prior to use by the user based on the calculated experience index assigned to the user further comprises selecting a user interface for the application for the user, based on the calculated experience index assigned to the user, and outputting the selected user interface.

19. The computer program product of claim 15 wherein the program code for gleaning information concerning the configuration of the computer of the user at installation of the application further comprises program code for:

identifying applications configured to run on startup of the computer of the user, said identified applications being indicative of an experience level of the user.

20. The computer program product of claim 15 wherein the program code for gleaning information concerning the configuration of the computer of the user at installation of the application further comprises program code for:

identifying a version of the operating system installed on the computer of the user, said version of the operating system being indicative of an experience level of the user.

\* \* \* \* \*